April 25, 1950     J. L. BOWMAN     2,505,704
CHAIN DRIVE MECHANISM FOR SIDE DELIVERY RAKES
Filed March 4, 1948     6 Sheets-Sheet 1
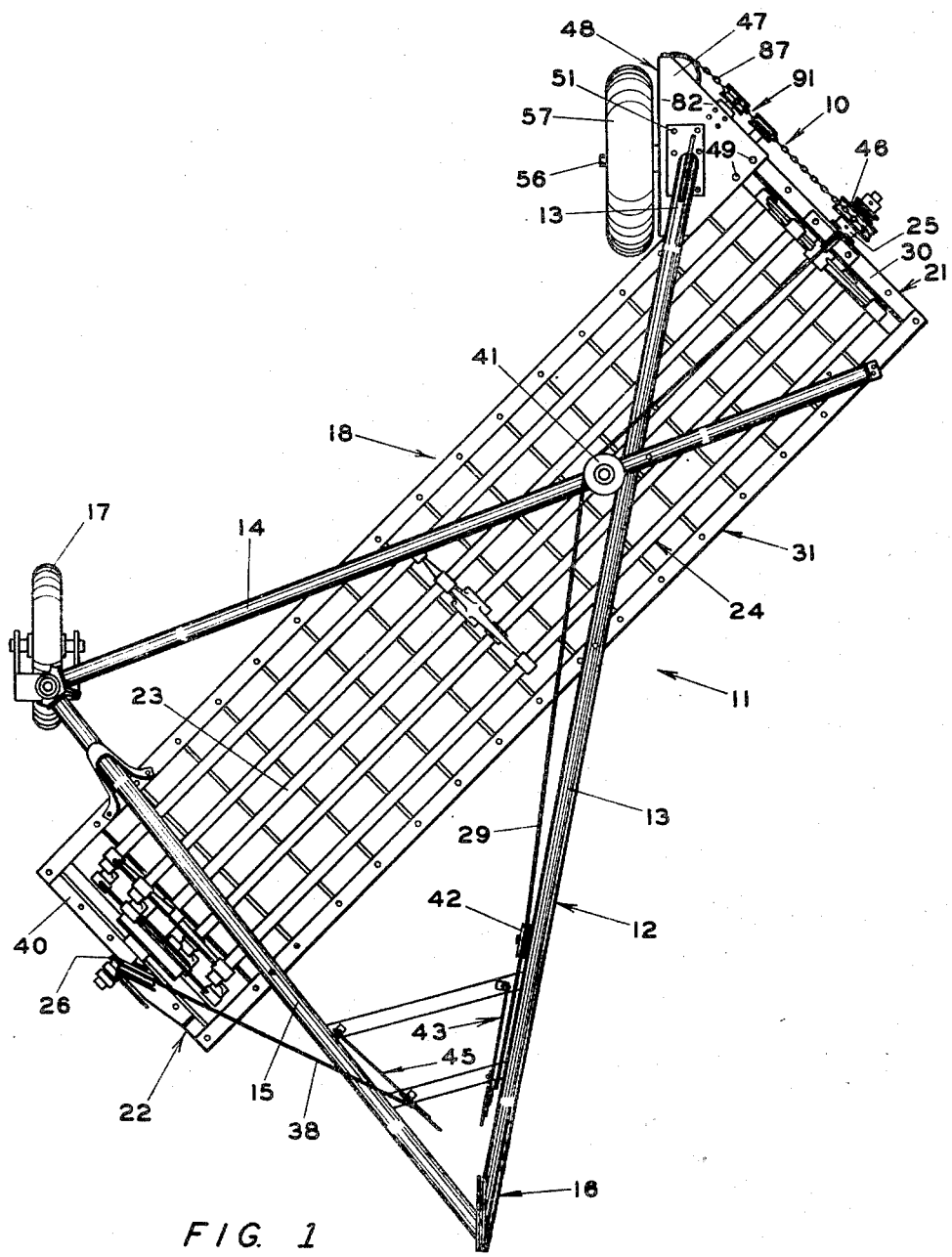
FIG. 1
INVENTOR.
JAMES L. BOWMAN
BY
ATTORNEY April 25, 1950 J. L. BOWMAN 2,505,704
CHAIN DRIVE MECHANISM FOR SIDE DELIVERY RAKES
Filed March 4, 1948 6 Sheets-Sheet 2

INVENTOR.
JAMES L. BOWMAN
BY
ATTORNEY

April 25, 1950 J. L. BOWMAN 2,505,704
CHAIN DRIVE MECHANISM FOR SIDE DELIVERY RAKES
Filed March 4, 1948 6 Sheets-Sheet 4
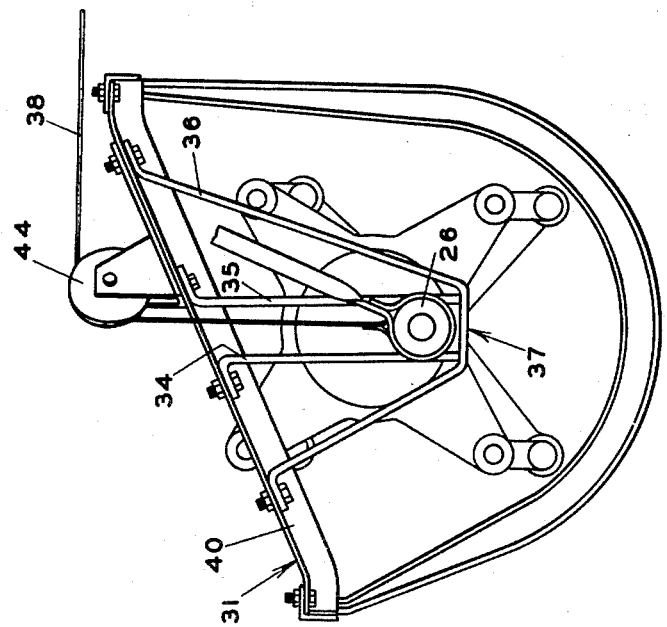
FIG. 5
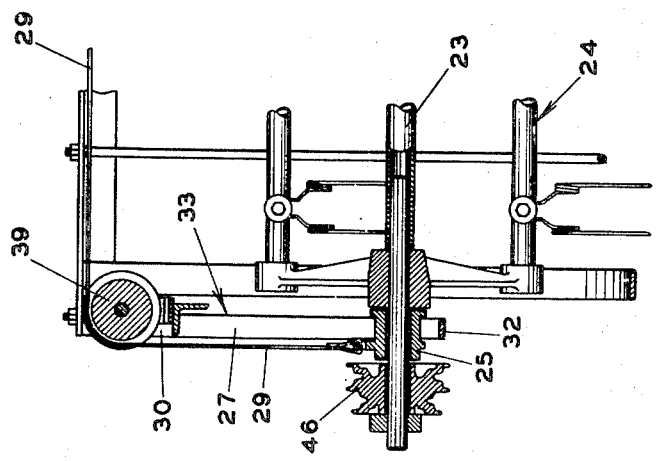
FIG. 4
INVENTOR.
JAMES L. BOWMAN
BY
ATTORNEY April 25, 1950   J. L. BOWMAN   2,505,704
CHAIN DRIVE MECHANISM FOR SIDE DELIVERY RAKES
Filed March 4, 1948   6 Sheets-Sheet 5

INVENTOR.
JAMES L. BOWMAN
ATTORNEY

April 25, 1950 J. L. BOWMAN 2,505,704
CHAIN DRIVE MECHANISM FOR SIDE DELIVERY RAKES
Filed March 4, 1948 6 Sheets-Sheet 6

INVENTOR.
JAMES L. BOWMAN
BY
ATTORNEY

Patented Apr. 25, 1950

2,505,704

UNITED STATES PATENT OFFICE 2,505,704

CHAIN DRIVE MECHANISM FOR SIDE DELIVERY RAKES

James L. Bowman, Eau Claire, Mich.

Application March 4, 1948, Serial No. 12,994

4 Claims. (Cl. 56—377)

This invention relates in general to a drive mechanism and more particularly to an endless chain, self tensioning, type of drive for the reel of a side delivery agricultural rake.

Conventional drive mechanisms, such as those utilizing gear trains or universal joints, are too cumbersome when the drive wheel is spaced any appreciable distance from the driven end of the rake reel. The said conventional drive mechanisms are especially cumbersome when, as disclosed in my above mentioned co-pending application, the rake reel is driven at that end, namely the trailing end thereof, which is exposed to the heaviest load during the raking operation.

Hence, in order to utilize the advantageous principles discovered in my side delivery rake, it also became necessary to discover a new means for driving the reel, which means was necessarily of greater simplicity, reliability, and flexibility than anything hitherto known. It should be noted, however, that although this problem became critical with my new rake, it is existent with all forms of side delivery rakes and my invention, though originating as an incident of, and here disclosed in connection with, my new rake, is applicable to conventional forms of rakes as a substantial improvement in the drive mechanisms, thereof.

Intricate combinations of a jack shaft and chains of the type presently in use are not sufficiently flexible. If the chain driving the rake reel is loose enough to permit raising and lowering the reel, it will jump the pulleys when speeded up. If said chain is tight enough to stay on the pulleys, then the rake reel is prevented by said chain from vertical, adjustable movement.

However, mere adaptation of known chain drive devices provided no satisfactory answer to the problem for a variety of reasons, among which were problems of vertical control and adjustment. For example there was the need for elimination or reduction of the component of force created by the pull of the reel driving chain, and imposed upon the reel vertical control mechanism, when said reel was in the raised position. This force has in the past necessitated a heavy duty control mechanism not conveniently adaptable to remote control.

Accordingly, a primary object of this invention is to provide a drive mechanism for a side delivery rake whose drive wheel is spaced an appreciable distance from the driven end of the rake reel, said drive wheel being at an acute angle with respect to said rake wheel such that conventional drives are not conveniently appropriate.

A further object of this invention is to provide a drive mechanism, as aforesaid, whereby the drive wheel may be conveniently and operatively connected with, while substantially spaced from, the trailing end of the rake reel, which end is exposed to the heaviest load during the raking operation.

A further object of this invention is to provide a drive mechanism, as aforesaid, which is equipped with an automatic, self-tensioning device whereby the distance between the driving means and the driven means of said drive mechanism may vary without sacrificing the efficiency of the drive mechanism.

A further object of this invention is to provide a drive mechanism, as aforesaid, which does not impose any additional load upon the device which controls the vertical positions of the rake reel, especially when said rake reel is being moved into the raised position.

A further object of this invention is to provide a drive mechanism, as aforesaid, with a controllable means whereby said drive mechanism may be disconnected from the driving means when it is not necessary or desirable to rotate the rake reel.

Other objects and purposes of this invention will become apparent to persons familiar with this type of equipment upon referring to the accompanying drawings and upon reading the following specification.

In order to meet those objects and purposes heretofore mentioned, as well as others incidental thereto and associated therewith, I have provided a self-tensioning drive mechanism comprised of an endless chain, having links similar to those found in a log chain, which chain operatively and directly connects a driving pulley, mounted on the drive wheel shaft, with a driven pulley mounted on the driven extremity of the rake reel shaft. A suitable clutch and clutch control mechanism are provided to engage and disengage the drive mechanism and the drive means at the will of the operator. A tensioning device engages said endless chain intermediate the drive means and the driven means.

For a particular preferred embodiment of the invention, attention is directed to the accompanying drawings in which:

Figure 1 is a top plan view of a side delivery rake provided with the self-tensioning drive mechanism to which this invention relates.

Figure 4 is a sectional view of Figure 2 taken along the line IV—IV.

Figure 5 is an end elevation of the rake basket taken at that end remote from the drive mechanism.

*Construction*

Figure 2:
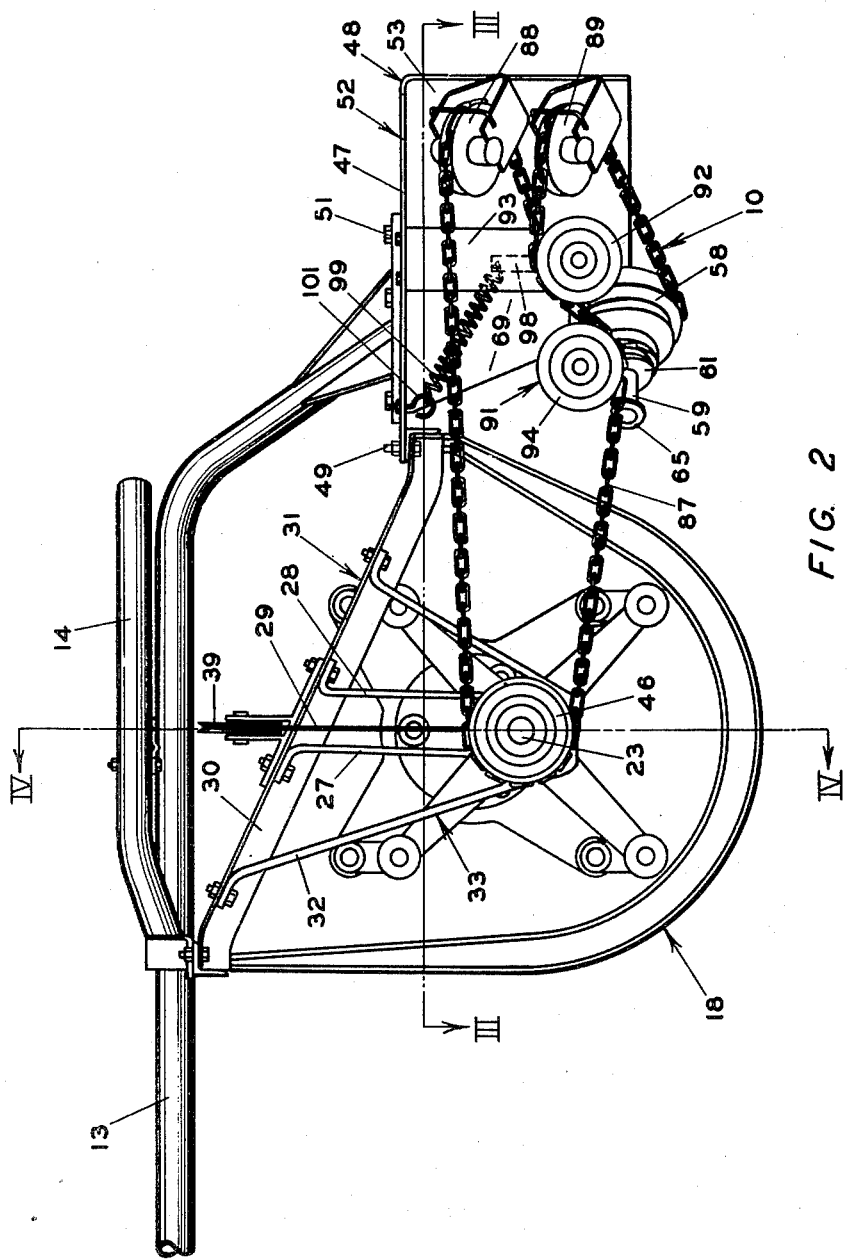
Figure 2 is an end elevation of the rake reel and basket including the drive mechanism.
Figure 3:
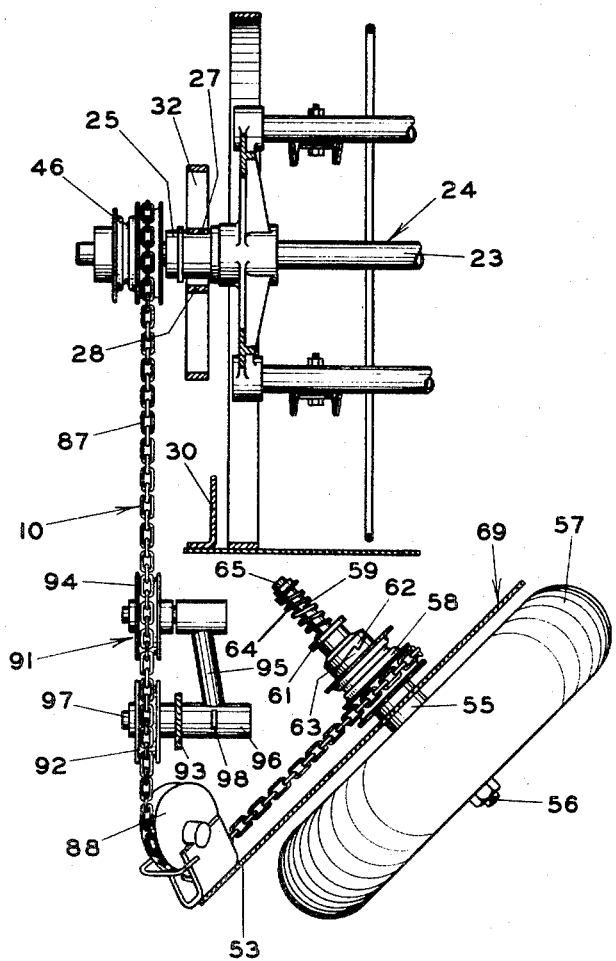
Figure 3 is a sectional view of Figure 2 taken along the line III—III.

The self-tensioning drive mechanism 10 is associated in Figures 1, 2 and 3, with a side delivery agricultural rake 11, which is disclosed in my aforesaid co-pending application, for illustrative purposes only. It will be understood that such illustration is not intended to impose any limitations upon the scope of my invention.

As shown in Figure 1, the rake 11 is comprised of a triangularly shaped, support frame 12 having a longitudinal beam 13, a lateral beam 14 and a connecting beam 15. The hitching corner 16 of the frame 12, where one end of the longitudinal beam 13 and one end of the connecting beam 15 are secured together, may be secured to and supported upon the rear end of a suitable traction device, such as a common farm tractor (not shown).

The lateral beam 14 and connecting beam 15 meet at another corner, which corner is supported upon a pivot wheel 17. The longitudinal and lateral beams intersect intermediate their extremities. A rake basket 18, which may be of a conventional type, is suspended at one end, hereinafter referred to as the trailing end 21, from said support frame 12 by attachment to those ends of said longitudinal and lateral beams 13 and 14, respectively, remote from the connecting beam 15. The other end, hereinafter referred to as the leading end 22, of said basket 18 is secured to and suspended from the connecting beam 15.

The reel shaft 23 of the rake reel 24 is rotatably supported at its ends within the reel shaft bearing housings 25 and 26. The bearing housing 25 (Figure 4) is vertically, slidably suspended between the parallel bearing guide rails 27 and 28 by means of the reel elevation cable 29 (Figure 2). The bearing guide rails 27 and 28 are secured at their upper ends to the trailing end cross bar 30 of the rake basket frame 31. The lower ends of said guide rails 27 and 28 are secured, as by welding, to the guide rail support strap 32, whose ends are also secured to the cross bar 30 of the basket frame 31. The guide rails 27 and 28, and the guide rail support strap 32 comprise the bearing support bracket 33.

A pair of parallel, bearing guide rails 34 and 35 (Figure 5) which are similar in all respects to the guide rails 27 and 28, are secured to the leading end cross bar 40 of the rake basket frame 31 at the leading end 22, thereof, and to the guide rail support strap 36. The guide rails 34 and 35 and the guide rail support strap 36 comprise the bearing support bracket 37. The bearing housing 26 is vertically, slidably suspended between the guide rails 34 and 35 by means of the reel elevation cable 38. The support brackets 33 and 37 may be, and preferably are, identical in all respects.

The reel elevation cable 29 extends by means of the pulleys 39, 41 and 42 to a reel elevation control 43 mounted upon the frame 12 near the hitching corner 16, thereof. The reel elevation cable 38 extends by means of the pulley 44 to the reel elevation control 45 which is mounted upon the frame 12 near the hitching corner 16, thereof.

A reel pulley 46 is secured to and is rotatable with that end of the reel shaft 23 which extends beyond the reel shaft bearing housing 25 (Figure 4).

Figure 7:
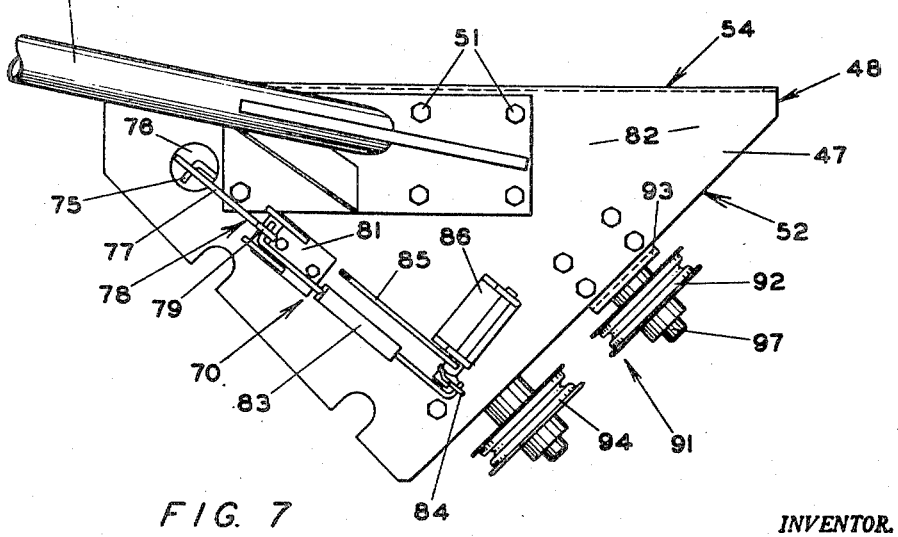
Figure 7 is a top plan view of the drive wheel support bracket including a portion of the clutch control mechanism.

The horizontal flange 47 of the drive wheel support bracket 48 is secured, as by means of the bolts 49 (Figure 2), to the rake basket frame 31 near the trailing end 21, thereof. The longitudinal beam 13, as appearing in Figures 1 and 7, is also secured, as by means of welding and the bolts 51, to the wheel bracket horizontal flange 47. The flange 47 is preferably triangular in shape and so arranged with respect to the basket frame 31 that the edge 52, thereof, is substantially in line with the cross bar 30.

The drive wheel bracket vertical flange 53, which lies within a plane intersecting the reel shaft 23 at an angle of approximately 45 degrees in this particular embodiment, depends from and is integral with the edge 54 of said wheel bracket horizontal flange 47. A drive wheel shaft bearing housing 55 (Figures 3 and 8), which is secured, as by welding, to the lower edge of the vertical flange 53, rotatably supports the drive wheel shaft 56. A drive wheel 57 is secured to and rotatable with that end of the drive shaft 56 which extends away from the rake basket 18. A driving pulley 58 is rotatably supported upon that portion of said drive shaft 56 adjacent to the vertical flange inside surface 69.

Figure 10:
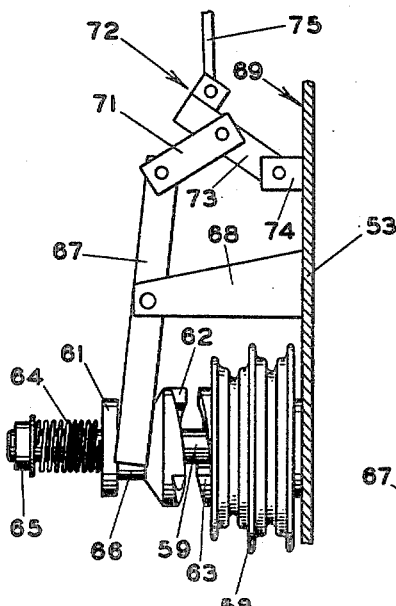
Figure 10 is the same as a portion of Figure 8 except that the clutch is shown as disengaged from the driving pulley with a portion of the clutch control mechanism in an appropriate position.

A portion 59 of the drive shaft 56, which extends inwardly beyond the driving pulley 58, has a non-circular cross-section or is otherwise provided with suitable means whereby a driving clutch 61 may be rotatable with, and slidably supported upon, the extended portion 59 of the drive shaft 56. The clutch 61 (Figures 8, 9 and 10) has clutch teeth 62 which may engage the driving pulley teeth 63 on the driving pulley 58. A clutch spring 64, which is sleeved about the drive shaft extension 59, is held in compression between the clutch 61 and a lock collar 65 affixed to the extremity of the drive shaft extension 59. Thus, the clutch teeth 62 are normally urged into engagement with the driving pulley teeth 63 by the clutch spring 64 (Figures 3, 8 and 9).

The clutch 61 (Figures 8 and 9), is provided with an annular recess 66 which is rotatably engaged by the lower end of a clutch lever 67. The clutch lever 67 is pivotally supported intermediate its extremities upon the clutch lever bracket 68, (Figures 6, 8 and 10), which bracket is secured to the inside surface 69 of the wheel bracket vertical flange 53. The upper end of the clutch lever 67 is pivotally engaged by one end of one link 71 of the toggle joint 72. The other link 73 of said toggle joint is pivotally secured to the vertical flange inside surface 69 by means of the toggle link bracket 74.

The toggle joint is pivotally engaged near the junction of its two links 71 and 73 by the lower end of a connecting rod 75, which rod extends upwardly through the opening 76 in the drive wheel bracket horizontal flange 47. The upper end of said rod 75 is pivotally associated with the horizontal arm 77 (Figures 6 and 7) of an L-shaped lever bar 78, which bar is pivotally supported at the junction of its horizontal arm 77 and vertical arm 79 upon a lever bar bracket 81. The bar bracket 81 may be secured in a conventional manner to the upper surface 82 of the wheel bracket horizontal flange 47. The lever bar vertical arm 79 is pivotally engaged by a link rod 83, which rod also engages the force arm 84 of a control lever 85. The control lever 85 is pivotally supported upon a control lever bracket 86, which bracket may be secured in a conventional manner to the upper surface 82 of the wheel bracket horizontal flange.

Figure 6:
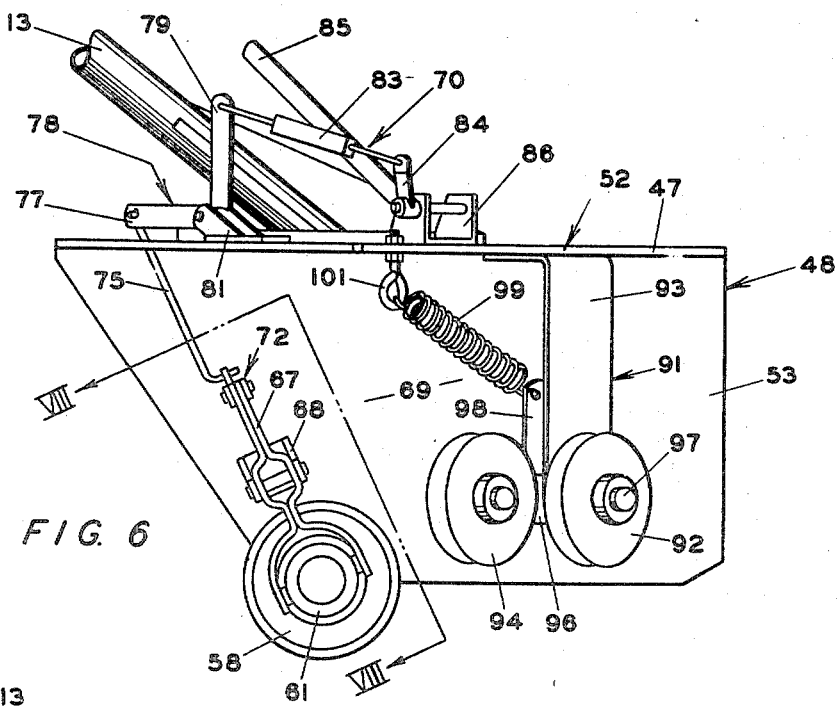
Figure 6 is an oblique, side view of the drive wheel support bracket including the clutch control mechanism.
Figure 8:
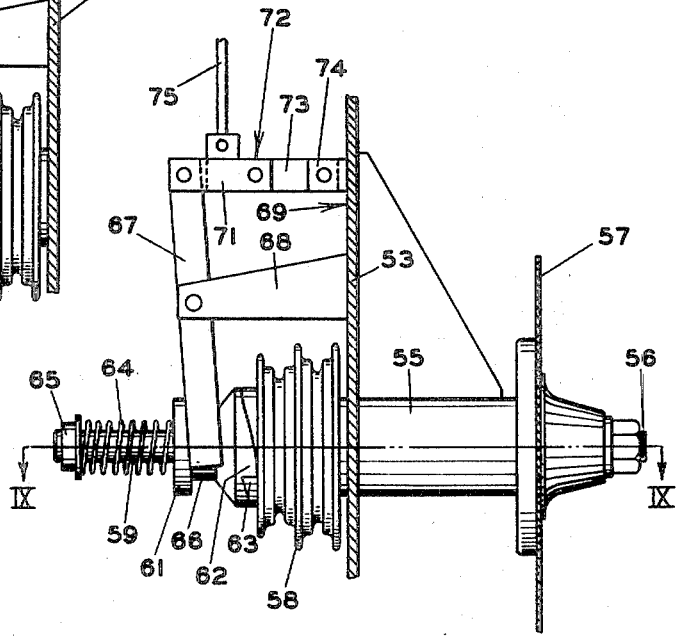
Figure 8 is a sectional view of Figure 6 taken along the line VIII—VIII.
Figure 9:
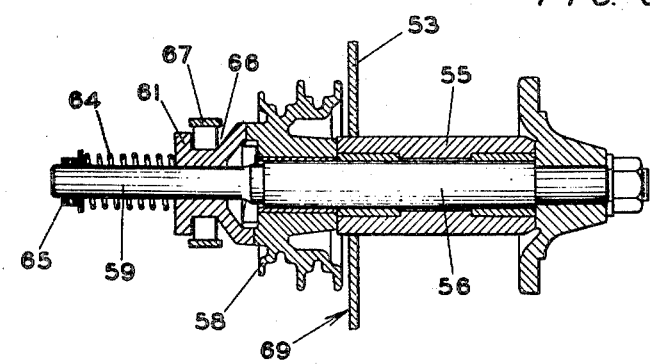
Figure 9 is a sectional view of Figure 8 taken along the line IX—IX.

When the control lever 85 is in the lowered position, as shown in Figure 6, the clutch 61 engages the driving pulley 58, as appearing in Figure 8. When the control lever 85 is raised, or moved in a clockwise direction, as appearing in Figures 7 and 6, respectively, the linkage including the force arm 84, the link rod 83, the lever bar 78, the connecting rod 75 and the toggle joint 72 function together to move the upper end of clutch lever 67 towards the wheel bracket vertical flange 53. This action causes the lower end of said clutch lever 67, which end rotatably engages the clutch 61, to move outwardly, thereby disengaging the clutch 61 from the driving pulley 58.

It will be understood that the above disclosed clutch and clutch control mechanism 70 have been described in detail for the purpose of illustrating one preferred, but by no means the only, manner in which, and means by which, the drive mechanism 10 may become engaged with and disengaged from the drive wheel 57.

The reel pulley 46 and the driving pulley 58 are preferably of a type which is suited to co-operation with an endless link chain 87, which chain operably connects the pulleys 46 and 58. Inasmuch as the said pulleys rotate in different planes, the chain 87 is engaged by the upper and lower direction changing pulleys 88 and 89, respectively (Figures 2 and 3), intermediate the driving pulley 58 and the reel pulley 46. The direction changing pulleys 88 and 89 are rotatably mounted upon the vertical flange inside surface 69 in a substantially horizontal position. Therefore, it becomes apparent that the chain 87 advantageously has links of the type found in a log chain, so that it can be caused to change directions around pulleys in different planes without impairing or reducing the operating efficiency of the drive mechanism 10.

A tensioning device 91 (Figure 2) has a fixed tension pulley 92 which is rotatably suspended from the wheel bracket horizontal flange 47 adjacent to its edge 52 by means of the tensioning device support 93. As shown in Figure 3, the movable tension pulley 94 is rotatably supported, adjacent to and in line with the fixed pulley 92, upon one end of the pulley arm 95. The other end of said pulley arm is secured to a sleeve 96, which is rotatably supported upon an extended portion of the fixed pulley shaft 97, which shaft is rotatably supported upon and at the lower end of the tensioning device support 93. The tensioning device is preferably located so that the chain 87 passes over the fixed pulley 92 and underneath the movable pulley 94 between the lower direction changing pulley 89 and the reel pulley 46.

A tension arm 98, which is substantially perpendicular to the pulley arm 95, is secured at its lower end to the pulley arm sleeve 96. The upper end of said tension arm 98 is secured to one end of a tensioning spring 99 whose other end is anchored, by means such as the hook bolt 101, to the wheel bracket horizontal flange 47. The hook bolt 101 is so positioned that the spring 99 is under constant tension when the chain 87 passes over the fixed pulley 92 and under the movable pulley 94. As shown in Figure 2, the spring 99 tends to urge the movable pulley 94 downwardly against the chain 87, thereby imposing a yieldable tension thereon.

The tensioning device 91 imparts a flexibility to the chain 87 whereby the reel pulley 46 may be moved upwardly or downwardly, within the limits imposed by the guide rails 27 and 28, without causing the chain 87 to become either undesirably taut or slack.

The drive mechanism 10, as well as any other type of chain drive, imposes a sidewise pull or force upon the reel pulley 46 as the chain 87 rotates said pulley. As long as this sidewise pull is in a direction perpendicular to the guide rails 27 and 28, and 34 and 35, there is no vertical component to the said sidewise pull. However, if the rake reel is raised away from this particular position, an additional strain is placed upon the reel elevation cables 29 and 38 and their associated parts by the vertical component of the chains' sidewise pull.

In order to limit the extent of the vertical component of the chains' sidewise pull, the guide rails 27 and 28, and 34 and 35 are tilted so that the direction of the chains' sidewise pull is perpendicular to the said guide rails at that point where the reel shaft passes between said guide rails when the rake reel 24 is in its normal operating position.

*Operation*

The clutch teeth 62 are urged by the clutch spring 64 to operatively engage the driving pulley teeth 63 when the control lever 85 of the clutch control mechanism 70 is in the lowered position, as shown in Figures 6 and 8. Thus, when the rake 11 is drawn along the ground, the drive wheel 57, which is rotatably secured to one end of the drive shaft 56, rotates the clutch 61, because said clutch is rotatable with the extended end 59 of said shaft 56. The driving pulley 58 moves the chain 87, which chain engages and rotates the reel pulley 46. The reel pulley 46 rotates the rake reel 24 through the reel shaft 23 to which both are secured.

The direction changing pulleys 88 and 89 are required because the driving pulley 58 and the reel pulley 46 do not rotate in the same plane. The chain 87 passes over the fixed pulley 92 and under the movable pulley 94 between the reel pulley 46 and the lower direction changing pulley 89. However, the fixed and movable pulleys 92 and 94, respectively, can engage the chain 87 at any point as long as they are adjacent to each other, and the chain passes over one pulley and under the other.

As shown in Figures 2 and 6, a tension is imposed upon the chain 87 because the movable pulley 94 is urged in a counterclockwise or downward direction with respect to the fixed pulley 92 by the tension spring 99. The effect of gravity works with the spring 99 in this arrangement.

The tensioning device 91 in keeping the chain 87 taut imposes a sidewise pull down upon the reel pulley 46 and the reel shaft 23 to which the reel pulley is secured. The chain, in turning the reel pulley also imposes a sidewise pull upon the reel pulley 46 and reel shaft 23.

In order to avoid an excessive vertical component to the said sidewise pull upon the reel shaft 23 when said shaft is raised, the guide rails 27 and 28 and 34 and 35 are slanted, as aforesaid. Moderate adjustments of the reel shaft 23 upwardly or downwardly produce no appreciable vertical component to the said sidewise pull upon the reel shaft 23, and, therefore become easy adjustments to make.

Ordinarily, when the rake reel 24 is moved to any great extent above or below its said normal operating position with respect to the ground, the reel is not being rotated. Consequently the greater part of the sidewise pull upon the reel shaft, produced by the chain 87 in turning the reel pulley 46, is not present. Therefore, under all but the most abnormal and unlikely conditions, the slanted guide rails eliminate excessive strains upon the reel elevation cables 29 and 38, and their associated pulleys and controls.

The drive mechanism 10 may be disengaged from the drive wheel 57 by raising the control lever 85. The clutch control mechanism 70 causes the clutch lever to pivot and disengage the clutch 61 from the driving pulley 58. Thus, the side delivery rake may be drawn along the road behind a suitable traction device, such as a common farm tractor, without rotating the rake reel 24.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In drive means for the reel of a side delivery agricultural rake wherein a rake reel is arranged with its rotational axis at an acute angle with respect to the direction of travel of said rake and there is present a vertical control means for raising and lowering said reel with respect to said basket and frame, the improvement comprising in combination: a driving wheel rotatably supported upon the rake frame intermediate the ends of said reel; a driving pulley releasably rotatable with said driving wheel; a driven pulley rotatable with said rake reel and located at the rearward end thereof, said driven pulley and said driving pulley being in intersecting, vertical, rotational planes; an endless, link, log chain operatively connecting said driven pulley and said driving pulley; a pair of adjacent, substantially horizontal, vertically spaced pulleys having closely positioned axes lying substantially in the line of intersection of said vertical rotational planes, each engaging one course of said chain intermediate said driving pulley and said driven pulley for aligning said chain with each thereof, said chain being turned in a substantially horizontal plane around said horizontal pulleys through an arc in excess of ninety degrees; a fixed tensioning pulley under but in contact with one course of said chain intermediate said driving and driven pulleys, and means rotatably supporting said fixed pulley upon said rake frame; a movable tensioning pulley above and in contact with the same course of said chain intermediate said fixed tensioning pulley and said driven pulley, and means rotatably supporting said movable pulley upon said rake frame and permitting arcuate movement with respect to said fixed pulley and around the axis thereof; resilient means urging said movable pulley downwardly with respect to said fixed pulley whereby a yieldable tension is imposed upon said chain; clutch and clutch control means whereby said driving pulley may be disconnected from said driving wheel at the will of an operator.

2. In drive means for the reel of a side delivery agricultural rake having a driving wheel secured to said rake frame in trail of the rake reel, the combination comprising: a driving pulley releasably rotatable with said driving wheel between it and said rake reel; a driven pulley rotatable with said rake reel at the trailing end thereof, said driven pulley and said driving pulley having intersecting, vertical, rotational planes; an endless, link, log chain operatively connecting said driven pulley and said driving pulley; a pair of adjacent, substantially horizontal, vertically spaced, direction changing pulleys having closely positioned axes lying substantially in the line of intersection of said vertical rotational planes engaging said chain intermediate said driving pulley and said driven pulley, around which direction changing pulleys said chain changes its direction of movement through an arc in excess of ninety degrees of angle in a horizontal plane; a fixed tensioning pulley and a movable tensioning pulley engaging a course of said chain intermediate the driven pulley and one of the direction changing pulleys, said chain passing over said fixed pulley and under said movable pulley; a resilient means urging said movable pulley downwardly with respect to said fixed pulley whereby a yieldable tension is imposed upon said chain; and substantially vertical guide rails associated with the trailing ends of said rake reel for mounting said driven pulley and permitting it to be raised or lowered said guide rails being so positioned that the direction of pull, imposed by the chain upon the driven pulley, is substantially perpendicular to said guide rails when said driven pulley is in its normal operating position with respect to said guide rails.

3. In drive means for a reel of a side delivery agricultural rake having a driving wheel secured to said rake frame in trail of the rake basket, the combination comprising: a driving pulley rotatable with said driving wheel; a driven pulley rotatable with one end of said rake reel, said driving and driven pulleys rotating in intersecting, vertical planes; an endless link chain operatively connecting said driven pulley and said driving pulley; a pair of adjacent, substantially horizontal pulleys having closely positioned axes lying substantially in the line of intersection of said vertical rotational planes engaging said chain and effecting an appreciable change in the direction of movement thereof in the horizontal direction; a tensioning device engaging said chain intermediate said driven and driving pulleys and imposing a yieldable tension upon said chain.

4. In drive means for the reel of a side delivery agricultural rake having a driving wheel, the combination comprising: a first vertical pulley, rotatable with said driving wheel; a second vertical pulley, rotatable with said reel, said first and second pulleys rotating in intersecting planes; a pair of adjacent, substantially horizontal pulleys, so positioned with respect to said first and second pulleys as to form a triangle therewith; an endless link chain operatively engaging in turn the first pulley, one horizontal pulley, the second pulley and the other horizontal pulley.

JAMES L. BOWMAN.

REFERENCES CITED

The following references are of record in the file of this patent:

UNITED STATES PATENTS

| Number | Name | Date |
| --- | --- | --- |
| 1,313,880 | Clausen | Aug. 26, 1919 |
| 2,403,401 | Rietz | July 2, 1946 |